United States Patent Office 3,405,003
Patented Oct. 8, 1968

3,405,003
SOIL RETARDANT COMPOSITION CONTAINING A SULFONATE - POLYACRYLAMIDE COPOLYMER SALT AND AN IMIDAZOLINE PLASTICIZER, PROCESS FOR TREATING A TEXTILE MATERIAL THEREWITH AND THE TREATED MATERIAL
George Robert De Paolo, Readington Township, Hunterdon County, William Julius van Loo, Jr., Middlesex, and Samuel James O'Brien, Dunellen, N.J., assignors to American Cyanamid Company, Stamford, Conn., a corporation of Maine
No Drawing. Filed Feb. 18, 1965, Ser. No. 433,788
12 Claims. (Cl. 117—139.5)

ABSTRACT OF THE DISCLOSURE

A soil retardant composition comprising a sulfonate-polyacrylamide copolymer salt and an imidazoline plasticizer. The composition is used in a process for imparting soil retardance to textile.

---

This invention relates to a soil retardant composition for the treatment of various substrate materials, to impart a soil retardant finish thereto.

The invention more particularly relates to the treatment of synthetic or cellulosic textile materials such as wool, rayon, nylon, polyester acrylic fabrics, cotton, linen, paper, and the like.

It is also within the scope of this invention to apply the soil retardant to other substrates which otherwise have an affinity for soiling elements, substrates such as painted surfaces, for example.

In the textile field and particularly in the rug industry, where in recent years widespread usage has been made of pastel colors and where the number of nonwool rugs, including blends of wool which tend to soil more readily than wool, has greatly increased, the need for an effective durable soil retardant has been emphasized.

It has been determined, generally, that fibers have small irregularities in their surfaces. These irregularities function as cavities which collect dirt and dirt particles, and irregularities tend to increase in number as their size decreases. Thus, it would be expected that smaller soil particles, particularly those measuring less than a micron, would be retained tenaciously in greater numbers than larger particles. This retention of soil particles in addition to soiling produces color change in the fiber of fabric and other undesirable effects.

The function of soil retardant particles, therefore, appears to be to fill imperfections in the fiber's surface, making it relatively smooth. In this way, it functions as a soil retardant. Thus, once a carpet is sprayed with a soil retardant, all subsequent impinging soil finds fewer unoccupied sites. The dirt cannot become firmly attached, and it is loosely held by the pile in the case of a pile rug, or falls to the bottom of the carpet. In either situation, it is easily removed as by vacuuming.

In the commercial use of prior soil retardant compositions, however, there is still some question as to the mechanism of operation of the soil retardants. For example, if a conventional soil retardant is applied within certain percentage ranges, based on the weight of the substrate, the soil retardant properly functions as a soil retardant. As contrasted to this, if a soil retardant is applied in percentages in excess of a particular maximum, the soil retardant may substantially acquire the properties of a soil scavenger, i.e., the soil retardant used in excess of a certain maximum causes the substrate to have a greater affinity for soiling than the untreated substrate. Therefore, each soil retardant may have an inherent maximum degree of effectiveness limited to a certain percentage range, and the effectiveness as a soil retardant cannot always be increased by an increase in the percentage based on the weight of the substrate. Also, to be commercially practical from the cost standpoint, it is necessary that a soil retardant be effective when applied in minor percentages.

Another prominnt problem which has arisen in the field of textiles has been the increased tendency of fabrics which were treated with various finishes for varying reasons, to become soil scavengers, i.e., to have a substantially increased affinity for soiling elements.

In response to the growing demand, compositions have become available which function to impart soil resistance to textile materials and in particular, to rugs. Certain of these prior compositions required organic dispersants and were applied as aqueous dispersions and dried. Generally speaking, soil retardants of this type were less effective than water-insoluble inorganic types. These inorganic materials, while effective as soil retardants, suffer from severe limitations. Certain of these materials produce dusting, which limits their commercial acceptability, while others tend to so modify the "hand" of the treated material that their widespread commercial acceptance is seriously restricted.

Another problem arising from the use of inorganic soil retardants is the inherent whitening effect of the soil retardant when employed in the treatment of colored substrates.

Another serious problem with prior soil retardants used in the textile art, is the tendency to degrade the strength of the backing material.

Another problem facing the textile manufacturers which substantially increased cost is the requirement of prior soil retardants of a high drying temperature after the application of the soil retardant to the substrate; temperatures of 212° F., or more are frequently required, and these temperatures have a tendency to discolor the treated fabric substrate.

The greatest of the problems, however, which has continued to exist, is the relatively low degree of durable effectiveness of any of the various prior art soil retardants.

An object of this invention is to provide a soil retardant composition.

A further object is to provide a process of treatment of a substrate with the soil retardant composition of this invention.

A further object is to produce a soil retardant which minimizes undesirable after-effects such as dusting, and tensile strength loss of the backing material.

A further object is to provide a soil retardant finish which improves or which does not substantially adversely modify the "hand" of the textile fabric substrate to which it is applied.

A further object is to provide a soil retardant composition and process whereby the treated substrate may be dried at low temperatures which cause little or no discoloration of the treated substrate.

Another object of this invention is to provide a soil retardant composition of high efficiency when applied at low percentage, based on the weight of the fabric.

Another object of this invention is to provide a soil retardant which overcomes the problem of whitening effect normally encountered when a conventional inorganic soil retardant is applied to a colored substrate.

Other objects of this invention will become apparent to those of ordinary skill in the art, in the light of the problems discussed above and the following disclosure.

The objects of this invention are achieved by applying to a substrate a soil retardant composition comprising (1)

a water-soluble polymer of (a) sodium vinyl sulfonate or allyl sulfonate and (b) acrylamide, and (2) a water-soluble or dispersible plasticizer selected from a particular group of imidazoline-type compounds, the relative polymer: plasticizer ratio ranging from about 5:1 to about 35:1.

The process of this invention comprises applying the composition of particular percentages of the respective ingredients, to the substrate being treated, at appropriate temperatures.

As stated above, the composition of this invention comprises a polymer, and an imidazoline-type compound.

The copolymer of this invention is described in copending application Ser. No. 151,454, filed Nov. 10, 1961, now abandoned. The copolymer is a reaction product of an acrylamide and a member selected from the group consisting of alkali metal vinyl sulfonate (such as sodium ethylene sulfonate) or an alkali metal allyl sulfonate and mixtures thereof, in which polymer the sulfonate and the acrylamide are present in mol ratios of from about 0.3:1 to about 3.0:1. The polymer is used normally in an amount varying from about 0.25 to about 4% based on the dry weight of the material.

The term "an acrylamide" as employed herein in the instant invention includes compounds of the following general structure:

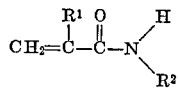

where $R^1$ is selected from the group consisting of hydrogen, methyl or ethyl, and where $R^2$ is selected from the group consisting of hydrogen, or lower alkyl containing from 1 to about 4 carbon atoms. Preferably the acrylamide employed is acrylamide per se.

The alkali metal ethylene sulfonates contemplated for use in forming the polymers employed in the present invention may be the sodium, potassium, or lithium salts of ethylene-sulfonate, although preferably from the point of view of convenience and economics, the sodium salt is employed. In preparing the said polymer, the alkali metal ethylene sulfonate and the acrylamide are employed as monomers in such amounts as will produce a polymer in which the components are present in a relative molar ratio of about 0.3:1 to 3:1, respectively, of alkali metal ethylene sulfonate to the acrylamide, and preferably within a relative range of about 1:1.3 to 1:0.90, respectively.

These polymers may be prepared by reacting suitable amounts of the monomeric materials in either an aqueous or an alcoholic reaction medium employing a suitable polymerization catalyst, as for example, a free radical catalyst system at temperatures of from between 30° C. and 100° C. until a polymer of the desired composition is prepared. Illustratively, polymers contemplated for use in the present invention and their process of preparation will be demonstrated in the examples hereinafter.

In general, the polymers of the instant invention may be described as water soluble materials characterized by molecular weight above 10,000 and preferably above 100,000, or in the range of 10,000 to 500,000 and preferably 100,000 to 500,000.

The copolymers which give the preferred results in the practice of this invention are (1) sodium allyl sulfonate-acrylamide (normally about 35%); (2) sodium vinyl sulfonate-acrylamide (normally about 13.4%).

The imidazoline plasticizer component of the composition of this invention is selected from the group consisting of three basic types:

(a)

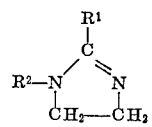

where $R^1$ is a long chain alkyl group of more than about 7 carbons, and $R^2$ is hydrogen or a short chain alkyl of not more than about 5 carbons, containing either hydroxyl or amine groups as substituents.

(b)

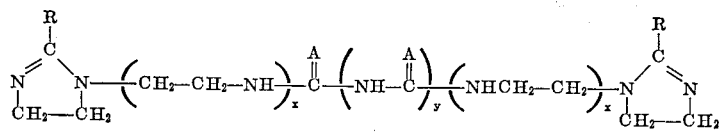

where R is an alkyl group of from about 12 to about 22 carbon atoms, inclusive, $x$ is selected from the group consisting of 1 and 2, $y$ is a small integer from 0 to 3, and A is selected from the group consisting of oxygen (O) and sulfur (S);

(c)

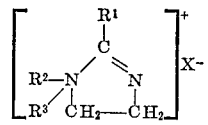

where $R^1$ is a long chain alkyl group of more than about 7 carbons, $R^2$ is hydrogen or a short chain alkyl of not more than about 5 carbons, containing either hydroxyl or amine groups as substituents, $R^3$ is hydrogen or a short chain alkyl of not more than about 5 carbons, containing either hydrogen or amine groups as substituents, and X is an anion such as any one of the halides, $NO_2^-$; $SO_4^=$; the methosulfates such as $CH_3-O-SO_3^-$; $H_2PO_4^-$; and the like.

The imidazoline referred to above beside the letter $a$ pared by the following methods.

The imidazoline referred to above beside the letter "$a$" is the reaction product of 1 mole of a fatty acid or the amide thereof and 1 mole of polyethylene polyamine of the general formula

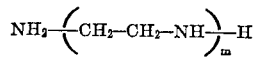

where $m$ is 2 or 3.

The reaction is carried out for a period of about 1 to about 3 hours at about atmospheric pressure and at a temperature of from about 100° C. to about 350° C. (preferably from about 100° C. to about 300° C.) to effect the removal of about 2 moles of water where the acid is employed or removal of about 1 mole of each of water and ammonia, where the amide is employed. The reaction product is subsequently condensed to form a 1,2-substituted imidazoline of the type represented above by the letter $a$.

The imidazoline type plasticizer represented above by the letter $b$ uses the reaction product referred to in the preceding paragraph as a beginning component. It is aged by a heat treatment for a period ranging from about 6 to about 14 hours, preferably about 8 to about 12 hours, to effect a change in the product when the acid is the starting material of the above described reaction. The nature of the change is presently unknown, but the aging transforms the resulting material from one capable of yielding an inadequate hand to one capable of forming a hand of softness well within the acceptable commercial range.

Such heat aging is unnecessary where one amide is employed as the starting material in producing the above reaction product.

The next step in the formation of the formula represented by "b" is cross-linking the reaction product with a compound of the typical generic formula:

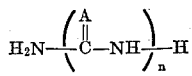

wherein n is 1 or 2, and A is oxygen (O) or sulfur (S).

The compound formed thereby is represented by the Formula b above.

The imidazoline type plasticizer referred to by c above is obtained by quaternizing the imidazoline of the type a. The preferred imidazoline plasticizers which gave the superior results in the practice of this invention are: (1) 2-hydroxyethyl, 1-(2,3-dihydroxypropyl-2-heptadecylimidazolinium chloride; (2) 2-hydroxyethyl-2-heptadecylimidazoline; (3) 1-aminoethylene-2-heptadecylimidazoline; (4) 2-(1H)heptadecylimidazoline.

In the treatment of rugs, carpets, fabrics, etc., the compositions of this invention are prepared in aqueous medium with a sufficient amount of each component so as to deposit from about 0.1% to about 5.0% copolymer salts on the carpet or fabric, and about 0.01% to about 4.0% of plasticizer salts on the carpet. The copolymer must be present in a ratio to the plasticizer, in a range of from about 5:1 to about 35:1; this ratio is believed to be critical.

The alkali metal ethylenesulfonate copolymer and the cross-linking agent may be applied to the synthetic hydrophobic textile material by any of the conventional procedures as, for example, immersion, dipping, spraying, padding and the like. After application onto the textile material, it is normally dried, as for example, at temperatures up to 250° F.

The method of application of the soil retardant composition of this invention will determine the concentration of the various components equal to that required on the fabric or carpet materials. If the textile to be treated is sprayed to a 50% weight increase, the concentration of the various components should be twice that required on the carpet materials or fabric. Thus, the concentration of the components in the treating composition varies according to the percentage of wet pickup obtained by the particular application procedure employed. The method of application is not critical so long as desired levels of the various components are applied on the textile substrate being treated. After application of the soil retardant composition to the textile substrate, the material is dried at temperatures ranging from room temperature of about 65° F. or more, up to and including temperatures normally utilized in the art for purposes of curing textile finish, such as between about 225° F. and about 400° F. or 450° F.

Dimethylolethylene urea (DMEU), for example, may be added to synthetics, such as nylon, as an adhesive or may be added to cellulosics as a cross-linking agent. In either situation, DMEU increases the durability of the soil-retardancy.

Where the DMEU is employed, with a catalyst, to impart cross-linking of the copolymer, additional heat treatment may be desired. However, by proper selection of cross-linking agent, catalyst, and concentrations, the desired degree of cross-linking can normally be accomplished during the normal drying process, as discussed above. In all cases the treated cellulosic is heated to a temperature at least sufficient to cross-link the copolymer.

Where wrinkle recovery is desired, relative temperature-time ratios are normally employed from about 290° F. to about 450° F. for a relative period of from about 3 minutes to about 15–30 seconds.

In order to illustrate the present invention the following examples are given primarily by way of illustration. No specific details or enumerations contained therein should be construed as limitations on the present invention except insofar as they appear in the appended claims.

All parts and percentages are by weight, unless otherwise specifically designated.

Example I through Example IV illustrate the preparation of the monovalent-radical-substituted sulfonate-polyacrylamide copolymer salt which is a component in the soil retardant composition of this invention.

EXAMPLE I

Into a reaction flask equipped with a moderate speed stirrer was entered 60 parts of sodium ethylenesulfonate, 160 parts of ethanol, 0.12 part azo-bis(isobutyronitrile) and 14 parts of acrylamide. The reaction mixture was flushed with $CO_2$ to remove oxygen and then heated to 560 C. for 25 minutes after which 14 parts of acrylamide and 40 parts of ethanol are then added. The polymerization was run for 18 hours at 55° C. The resulting polymer, being alcohol insoluble, was filtered off. The conversion of monomer to polymer was 80%.

Mol ratio of acrylamide/sodium ethylene sulfonate in the polymer was 0.958/1.0 by analysis.

EXAMPLE II

A mixture containing 10.0 parts (0.007 mole) sodium ethylene sulfonate (A), 2.5 parts (0.035 mole) of acrylamide (B), 40 parts of ethanol and 0.4 parts of azo-bis (isobutyronitrile) was refluxed for 2 hours at 78° C.

Conversion of monomer to polymer=65%; molar ratio of monomer in the reaction mixture, $A/B=1.23/1.00$.

EXAMPLE III

Into a reaction flask equipped with a mechanical stirrer, a condenser and thermometer, were entered 20 parts of sodium ethylene sulfonate, 3 parts of acrylamide, 11 parts of water and 3 milliliters of a 10% solution of ammonium persulfate. The flask was flushed with $CO_2$ to remove the oxygen and 4 milliliters of isopropanol were added. The mixture was then heated to 55–60° C. while moderate stirring was maintained. After stirring one hour at the aforementioned temperature, 2 parts of acrylamide was then added and washed in with 2 parts of water. This addition was again repeated after an additional hour of stirring. One hour after the second addition, 3 parts of acrylamide were then added and washed in with 1 milliliter of water and 1 milliliter of a 10% ammonium persulfate solution.

EXAMPLE IV

A mixture of 200 parts (1.535 moles) of sodium ethylene sulfonate (A), 100 parts (1.412 moles) acrylamide (B), 665 parts of methanol and 0.4 parts of azo(bis-isobutyronitrile) was heated at 55° C. for 5 hours.

Conversion of monomer to polymer=52.6%; molar ratio of monomer in the reaction mixture, $A/B=1.09/1.0$; molar ratio of monomer in polymer $A/B=0.81/1.0$.

Examples V, VI, VII, VIII, IX, and X and their corresponding illustrative Tables I, II, III, IV, V and VI illustrate the soil retardant composition of this invention.

For convenience, components used in the compositions as shown in the following Examples V through X and in the following tables are designated as follows.

Copolymers:
    Sodium allyl sulfonate/polyacrylamide (35%) _____ SAS/AM
    Sodium vinyl sulfonate/polyacrylamide (13.4%) _____ SVS/AM Plasticizers:                                         No.
    1-(2-hydroxyethyl), 1(2,3 - dihydroxypropyl)-2-heptadecylimidazolinium chloride _____ 1
    1 - (2 - hydroxyethyl)-2-heptadecylimidazoline __ 2
    1 - (2 - aminoethyl) - 2 - heptadecylimidazoline (cross-linked with urea) _____ 3
    2-(1H)heptadecyl imidazoline _____ 4

Cross-linking agent: Dimethylol ethylene urea — DMEU
Catalyst:
    Aluminum chloride — $AlCl_3 \cdot 6H_2O$
    Magnesium chloride — MX The following details and examples will more fully describe this invention, and all parts and percentages given are by weight and temperatures given in degrees Fahrenheit.

EXAMPLE V

Portions of a nylon pile carpet were treated with the following compositions through a micro-set padder.

| Treatment | Parts by weight | | |
|---|---|---|---|
| | 1 | 2 | 3 |
| Ingredients: | | | |
|   SAS/AM Copolymer (35%) | 1.45 | 1.42 | 1.45 |
|   Plasticizer #4 (2%) | | 1.50 | |
|   Plasticizer #1 (25%) | | | 0.75 |
|   Water | 98.75 | 97.08 | 100 |
|   Wet Pickup (1%) | 100 | 100 | 100 |
| Percent solids on carpet: | | | |
|   SAS/AM | 0.5 | 0.47 | 0.5 |
|   Plasticizer | 0.0 | 0.03 | 0.0375 |

(Since the carpet swatches treated consisted of approximately 50% backing and 50% pile and the treatment essentially modifies the pile only, it may be considered that a 200% wet pickup was obtained on the pile and the solids on the pile is double that indicated for the carpet.)

After treating, the carpet swatches were dried for 4 hours at 140° F. in a circulating hot air oven. Soiling was performed in accordance to the method described on pages 59–63, American Dyestuff Reporter, May 13, 1963. Degree of soil was determined using a Photovolt 610 reflectometer and converted to soiling indices as described in "Accelerated Soiling Test—Juvenon Soil Retardant R," American Cyanamid Co., Textile Finishing Bulletin No. 148A, Bound Brook, N.J., December 1955. Results of the above treatments are shown in Table I.

TABLE I

| Treatment | Plasticizer | Soiling index |
|---|---|---|
| 1 | No plasticizer | 0.79 |
| 2 | #4 | 0.46 |
| 3 | #1 | 0.68 |

Results show soil retardance was obtained on all three treated carpet samples (soil index less than 1.00). Incorporation of plasticizer #1 or #4 produced greater retardance than when SAS/AM copolymer was used alone. The imidazoline plasticizer (#4) was somewhat more effective in reducing the soil index than was the quaternary imidazolinium compound (#1). These experiments indicate the advantage of the SAS/AM plasticizer combination over SAS/AM treatment alone and illustrate the utility of the two imidazoline plasticizers.

EXAMPLE VI

Swatches of both (1) *nylon* and (2) *wool* carpets were treated with the following compositions by a spraying technique:

| Treatment | Parts by weight | |
|---|---|---|
| | 4 | 5 |
| Ingredients: | | |
|   SAS/AM Copolymer (35%) | 28.6 | 28.6 |
|   Plasticizer #1 (26%) | | 2.31 |
|   Water | 471.4 | 469.09 |
|   Wet pickup (percent) | 200 | 200 |
| Percent Solids on pile: | | |
|   SAS/AM | 2.0 | 2.0 |
|   Plasticizer | 0.0 | 0.12 |

The treated nylon and wool swatches were dried for 4 hours at 140° F. as described in Example 1.

Soiling tests were made by placing the treated swatches on the floor in a special pattern along with untreated controls. (See reference to soil test as previously described.) These were exposed to ordinary everyday walking conditions, e.g., dry soil, wet soil, tarry deposits, etc. The design of the swatches was changed frequently according to a plan similar to that proposed by A.A.T.C.C. (loc. cit.) which would subject each swatch to equal exposure in wear. After each pattern change the A.A.T.C.C. (loc. cit.) recommendations were followed to a predetermined level of soiling. Soil index reflectance measurements were made on the swatches before and after exposure to the wear test and soil index values calculated as in the test employed in Example 1.

Results are shown in Table II.

TABLE II

| Treatment | Soil index | | Hand | | Plasticizer |
|---|---|---|---|---|---|
| | Nylon | Wool | Nylon | Wool | |
| 4 (control) | 0.84 | 0.56 | Stiff | Stiff | |
| 5 | 0.40 | 0.43 | Soft | Soft | #1 |

The results indicate that the combination of SAS/AM copolymer and plasticizer produced better soil retardancy than the SAS/AM copolymer alone on both the nylon and wool carpet samples and with additional softness.

EXAMPLE VII

Aqueous applications of 0.12%, 0.5% or 1.0% solids of Plasticizer #1 alone were made on swatches of nylon carpet by spraying to 100% wet pick-up on the pile.

The thus treated swatches were dried for 2 hours at 140° F. and tested for soiling index by the "Accelerated Soiling Test-Method" as aforementioned.

TABLE III
[Results of Example VII]

| Percent solids applied (O.W.F.) | Soiling Index | Hand |
|---|---|---|
| 0.12 | .78 | Soft. |
| 0.5 | .89 | Do. |
| 1.0 | .90 | Do. |
| Untreated control | 1.00 | Harsh-sl. firm. |

Results show effective soil retardance at 0.12% solids, and as the solids are increased the treatment become less effective.

EXAMPLE VIII

Nylon taffeta swatches were treated with the following compositions by padding through a micro-set padder:

| Treatment | Parts by weight | |
|---|---|---|
| | 4 | 5 |
| Ingredients: | | |
|   SAS.AM (35%) | 11.4 | 11.4 |
|   Plasticizer #1 (26%) | | 1.0 |
|   DMEU (50%) | 1.6 | 1.6 |
|   $AlCl^3 \cdot 6H^2O$ (10%) | 6.0 | 6.0 |
|   Water | 81.0 | 80.0 |
|   Wet Pickup, percent | 50 | 50 |
|   Compatibility of baths | Good | Good |
| Percent solids on fabric: | | |
|   SAS.AM | 2.0 | 2.0 |
|   Plasticizer | 0.00 | 0.13 |
|   DMEU | 0.4 | 0.4 |
|   $AlCl^3 \cdot H^2O$ | 0.3 | 0.3 |

The treated nylon swatches were dried 2 minutes at 225° C. and cured 8 minutes at 300° F. The DMEU serves as a binder in these treatments.

(The purpose of this experiment was to determine the compatibility of a cross-linking resin with the SAS/AM-plasticizer composition and at the same time to ascertain the cross-linking of the copolymer on the fabric and its effect on soil retardance.)

The treated swatches were tested initially for soil retardancy according to the procedure outlined in Example 1. The results are given in Table IV.

TABLE IV

| Treatment No. | Soil index (initially) | Hand (initially) |
|---|---|---|
| 4 (control) | 0.71 | Stiff |
| 5 | 0.47 | Soft |

The results show the advantages of the SAS/AM plasticizer combination in soil retardancy and hand over the SAS/AM copolymer alone, even when used in the presence of the cross-linking agent.

EXAMPLE IX

To determine the effect of lower concentration of various plasticizers when used with a set concentration of SAS/AM copolymer, the following compositions were applied to swatches of *nylon* carpet by spraying, wherein all parts shown are by weight.

| Treatment No. | SAS-AM (35%) | Plasticizer #1 (26%) [Formula c] | Plasticizer #2 (10%) [Formula a] | Plasticizer #3 (10%) [Formula b] | Plasticizer #4 (10%) [Formula a] |
|---|---|---|---|---|---|
| 1 | 2.86 | None | None | None | None |
| 2 | 2.86 | 0.69 | | | |
| 3 | 2.86 | 0.46 | | | |
| 4 | 2.86 | 0.23 | | | |
| 5 | 2.86 | 0.12 | | | |
| 6 | 2.86 | | 1.82 | | |
| 7 | 2.86 | | 1.2 | | |
| 8 | 2.86 | | 0.6 | | |
| 9 | 2.86 | | 0.3 | | |
| 10 | 2.86 | | | 1.8 | |
| 11 | 2.86 | | | 1.2 | |
| 12 | 2.86 | | | 0.6 | |
| 13 | 2.86 | | | 0.3 | |
| 14 | 2.86 | | | | 1.8 |
| 15 | 2.86 | | | | 1.2 |
| 16 | 2.86 | | | | 0.6 |
| 17 | 2.86 | | | | 0.3 |

All of the above treating baths were brought to a final weight of 100 grams by the addition of water. A wet pickup of 200% based on the weight of the pile was obtained. This deposited 2.0% solids of SAS/AM on the pile of each carpet swatch and plasticizer solids of 0.36%, 0.24%, 0.12% and 0.06% according to the usage in the application bath. The treated carpet swatches were dried for 4 hours at 140° F. in a circulating hot air oven. Tests for soil index and hand were made and results are shown in Table V.

TABLE V

| Treatment Nos. | Plasticizer used | Percent applied | Soil index (initial) | Hand (initial) |
|---|---|---|---|---|
| 1 | None | | 0.47 | Stiff. |
| 2 | #1 (Formula c) | 0.36 | 0.79 | Soft. |
| 3 | #1 (Formula c) | 0.24 | 0.21 | Do. |
| 4 | #1 (Formula c) | 0.12 | 0.23 | Do. |
| 5 | #1 (Formula c) | 0.06 | 0.21 | Do. |
| 6 | #2 (Formula a) | 0.36 | 0.24 | Do. |
| 7 | #2 (Formula a) | 0.24 | 0.22 | Do. |
| 8 | #2 (Formula a) | 0.12 | 0.14 | Do. |
| 9 | #2 (Formula a) | 0.06 | 0.24 | Do. |
| 10 | #3 (Formula b) | 0.36 | 0.19 | Do. |
| 11 | #3 (Formula b) | 0.24 | 0.21 | Do. |
| 12 | #3 (Formula b) | 0.12 | 0.22 | Do. |
| 13 | #3 (Formula b) | 0.06 | 0.26 | Do. |
| 14 | #4 (Formula c) | 0.36 | 0.28 | Do. |
| 15 | #4 (Formula c) | 0.24 | 0.24 | Do. |
| 16 | #4 (Formula c) | 0.12 | 0.23 | Do. |
| 17 | #4 (Formula c) | 0.06 | 0.28 | Do. |

Results indicate that the different plasticizer types employed with the SAS/AM copolymer produce different soil retardancy at equal use concentrations and that the most effective use concentrations varies with the plasticizer type. Although a concentration level of 0.12% to 0.24% solids on the carpet pile is generally an effective level, lower amounts may be used. The hand of the carpets was not appreciably affected and with some plasticizer the pile had a softer feel. Good softness of the treated carpet swatches was obtained with all of the plasticizers at all use concentrations.

Example IX thus shows different plasticizer types that are effective and further indicates the concentration range of usefulness.

EXAMPLE X

The following five treatments were sprayed on nylon carpet samples and additionally treatment #3 was sprayed on a viscose and a polyacrylonitrile carpet sample:

| Ingredients | Treatments | | | | |
|---|---|---|---|---|---|
| | #1 | #2 | #3 | #4 | #5 |
| SAS/AM (31%) | 64.6 | | 113.1 | | |
| SAS/AM (35%) | | 14.3 | | | |
| SVS/AM (13.4%) | | | | 75.0 | 75.0 |
| Plasticizer #1 | | 1.16 | 8.12 | | 2.31 |
| Water to | 2,000 | 500 | 3,500 | 1,000 | 1,000 |
| Wet pickup (on pile) percent | 200 | 200 | 200 | 200 | 200 |

In all cases 2.0% of the copolymer was deposited on the carpet piles and 0.12% of the plasticizer (where employed) was also deposited on the carpet pile.

The treated carpet swatches were dried for 4 hours at 140° F. and tested for soil index as described in Example II. Results are shown in Table VI.

TABLE VI

| Treatment No. | Carpet Type | Soil index (Initially) | Hand (Initially) |
|---|---|---|---|
| #1 | Nylon | [1] 1.05 | Stiff. |
| #2 | do | 0.39 | Soft. |
| #3 | do | 0.60 | Do. |
| #4 | do | [1] 0.93 | Stiff. |
| #5 | do | 0.55 | Soft. |
| Untreated | do | 1.00 | Do. |
| #3 | Viscose | 0.75 | Do. |
| Untreated | do | 1.00 | Do. |
| #3 | Polyacrylonitrile | 0.30 | Do. |
| Untreated | do | 1.00 | Do. |

[1] Control.

Results show treatments without plasticizers are much more soiled and have firmer hands than when plasticizer is added. Either SAS/AM or SVS/AM copolymers, in combination with the plasticizer imparted good properties of soil retardance and hand on the three carpet types used.

The soil retardant compositions of this invention are of particular value in the treatment of rugs, carpets and the like, as contrasted to the other textile materials to which it may be applied with varying degrees of good results. Preferably the textile material to which it is applied, contains at least 50% of cellulosic fibers. However, as will be noted in Example IX, above, synthetic substrates are well within the scope of this invention.

The soil retardant composition of this invention may be employed with other known soil retardants, such as normal phosphate, silicates, titanium hydrates or other known soil retardant materials. In addition, softeners, lubricants and the like may be employed where desired and where the effectiveness of the compositions as soil retardants is not significantly reduced.

While the present invention has been described in detail as to specific embodiments thereof, it is not intended that these details constitute undue limitations upon the scope of the invention, except insofar as the limitations appear in the appended claims.

We claim:
1. A soil retardant composition comprising an aqueous medium containing:
   (1) a sulfonate-polyacrylamide copolymer salt produced by reacting an acrylamide with a member selected from the group consisting of alkali metal vinyl sulfonates, the ratio of sulfonate to polyacrylamide being from about 0.3:1 to 3.0:1; alkali metal allyl sulfonates; and
   (2) an imidazoline plasticizer, said copolymer and said plasticizer respectively being of a ratio of from about 5:1 to about 35:1, the solids content of said composition being sufficient to deposit from about 0.1 to 5% of said copolymer and from about 0.01 to 4.0% of said plasticizer.
2. An aqueous soil retardant composition comprising an aqueous medium containing:
   (1) from about 0.1% solids to about 10.0% solids of sodium sulfonate-acrylamide copolymer salt of reactants comprising an acrylamide and a member se- lected from the group consisting of alkali metal allyl sulfonates and alkali metal vinyl sulfonates, the ratio of sulfonate to polyacrylamide being from about 0.3:1 to 3.0:1; and (2) from about 0.01% to about 4.0% solids of an imidazoline plasticizer, said copolymer and said plasticizer respectively being of a ratio of from about 5:1 to about 35:1, said percentages being based on the weight of the aqueous soil retardant composition, and said imidazoline plasticizer being selected from the group consisting of:

[1] 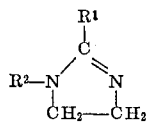

where $R^1$ is a long chain alkyl, and $R^2$ is selected from the group consisting of hydrogen, lower alkyl containing hydroxyl substituents, and lower alkyl containing amino group substituents;

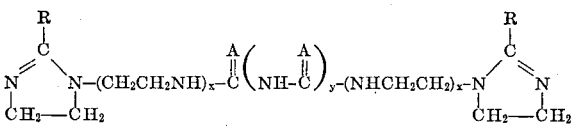

where R is an alkyl selected from the group consisting of about 12 to about 22 carbons, $x$ is a number selected from the group consisting of from about 1 to about 2, $y$ is a number selected from the group consisting of any number below 4, and A is selected from the group consisting of O and S substituents; and

[3] a quaternary compound of an imidazoline type represented in "[1]" above, having the typical formula:

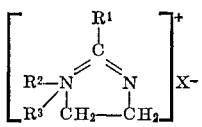

where $R^1$ is a long chain alkyl, $R^2$ is a substituent selected from the same group as $R^3$, $R^3$ is selected from the group consisting of hydrogen, a lower alkyl containing hydroxyl substituent sand lower alkyl containing amino-group substituents, and $X^-$ is an anion.

3. An aqueous soil retardant composition according to claim 2, including dimethylol ethylene urea in aqueous acidified diluent.

4. An aqueous soil retardant composition comprising an aqueous medium containing:

(1) from about 0.1% to about 10.0% solids of sodium sulfonate-acrylamide copolymer salt of reactants comprising an acrylamide and a member selected from the group consisting of alkali metal vinyl sulfonates and alkali metal allyl sulfonates, the ratio of sulfonate to polyacrylamide being from about 0.3:1 to 3.0:1; and (2) from about 0.01% solids to about 4.0% solids of a 1-(2-hydroxyethyl), 1-(2,3-dihydroxypropyl)-2-heptadecylimidazolinium plasticizer, said copolymer and said plasticizer respectively being of a ratio of from about 5:1 to about 35:1, said percentages being based on the weight of the aqueous soil retardant composition.

5. An aqueous soil retardant composition comprising an aqueous medium containing:

(1) from about 0.1% solids to about 10.0% solids of sodium sulfonate-acrylamide copolymer salt of reactants comprising an acrylamide and a member selected from the group consisting of alkali metal vinyl sulfonate and alkali metal allyl sulfonate, the ratio of sulfonate to polyacrylamide being from about 0.3:1 to 3.0:1; and (2) from about 0.01% solids to about 4.0% solids of 2-(H)heptadecylimidazoline, said copolymer and said plasticizer respectively being of a ratio of from about 5:1 to about 35:1, said percentages being based on the weight of the aqueous soil retardant composition.

6. An aqueous soil retardant composition comprising an aqueous medium containing:

(1) from about 0.1% solids to about 10.0% solids of sodium sulfonate-acrylamide copolymer salt of reactants comprising an acrylamide and a member selected from the group consisting of alkali metal vinyl sulfonates and alkali metal allyl sulfonates, the ratio of sulfonate to polyacrylamide being from about 0.3:1 to 3.0:1; and (2) from about 0.01% solids to about 4.0% solids of 1-(2-aminoethyl)-2-heptadecylimidazoline plasticizer.

said copolymer and said plasticizer respectively being a ratio of from about 5:1 to about 35:1, said percentages being based on the weight of the aqueous soil retardant composition.

7. An aqueous soil retardant composition comprising an aqueous medium containing:

(1) from about 0.1% solids to about 10.0% solids of sodium sulfonate-acrylamide copolymer salt of the group consisting of alkali metal allyl sulfonates, the ratio of sulfonate to polyacrylamide being from 0.3:1 to 3.0:1; and (2) from about 0.01% solids to about 4.0% solids of 1-(2-aminoethyl)-2-heptadecylimidazoline crosslinked with urea plasticizer, said copolymer and said plasticizer respectively being of a ratio of from about 5:1 to about 35:1, said percentages being based on the weight of the aqueous soil retardant composition.

8. A process for imparting soil retardancy to a textile substrate comprising treating said substrate with an aqueous medium containing:

(1) a monovalent-radical-substituted sulfonate-acrylamide copolymer salt of the group consisting of alkali metal vinyl sulfonates, and alkali metal sulfonates, the ratio of sulfonate to polyacrylamide being from about 0.3:1 to 3.0:1; and (2) an imidazoline plasticizer, said copolymer and said plasticizer respectively being of a ratio of from about 5:1 to about 35:1.

9. A process for imparting soil retardance to a textile substrate comprising treating said substrate with an aqueous medium containing:

(1) from about 0.1% solids to about 20.0% solids of sodium sulfonate-acrylamide copolymer salt of reactants comprising an acrylamide and a member selected from the group consisting of alkali metal vinyl sulfonates and alkali metal allyl sulfonates, the ratio of sulfonate to polyacrylamide being from about 0.3:1 to 3.0:1; and (2) from about 0.01% solids to about 8.0% solids of an imidazoline plasticizer, said copolymer and said plasticizer respectively being of a ratio of from about 5:1 to about 35:1, said percentages being based on the weight of the textile substrate, and said imidazoline being selected from the group consisting of:

1] 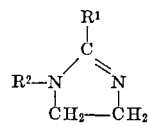

where $R^1$ is a long chain alkyl, and where $R^2$ is selected from the group consisting of hydrogen, lower alkyl containing hydroxyl substituents, and lower alkyl containing amino-group substituents;

[2] 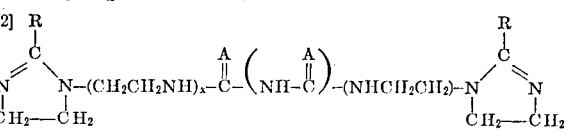

where R is an alkyl selected from the group consisting of about 12 to about 22 carbons, $x$ is a number selected from the group consisting of from about 1 to about 2, $y$ is a number selected from the group consisting of any number below 4, and A is selected from the group consisting of O and S substituents; and

[3] a quaternary compound of an imidazoline type represented in "[1]" above, having the typical formula:

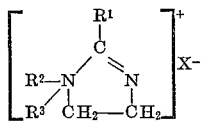

where $R^3$ is a substitutent selected from the same group as $R^1$ above, and where $X^-$ is an anion.

10. A process according to claim 9, in which said treating comprises spraying.

11. A process according to claim 9, in which said treating comprises padding said substrate, to impart said copolymer in a percentage from about 0.1% to about 5.0% and said imidazoline in a percentage from about 0.01% to about 2.0%, said substrate being textile fibers.

12. A process according to claim 9, including dimethylol ethylene urea in said aqueous medium, and heating said treated textile substrate to a temperature at least sufficient to cross-link the dimethylol ethylene urea, said textile substrate being a cellulosic.

References Cited
UNITED STATES PATENTS

| | | | |
|---|---|---|---|
| 3,090,704 | 5/1963 | Collins et al. | 117—138.8 |
| 3,134,686 | 5/1964 | Baechtold | 117—161 |

WILLIAM D. MARTIN, *Primary Examiner.*

T. G. DAVIS, *Assistant Examiner.*